C. MACMILLAN.
ELECTRIC SHIP PROPULSION.
APPLICATION FILED FEB. 11, 1920.

1,419,874.

Patented June 13, 1922.

Inventor:
Campbell Macmillan,
by /s/ Albert G. Davis
His Attorney.

UNITED STATES PATENT OFFICE.

CAMPBELL MACMILLAN, OF SCHENECTADY, NEW YORK, ASSIGNOR TO GENERAL ELETCRIC COMPANY, A CORPORATION OF NEW YORK.

ELECTRIC SHIP PROPULSION.

1,419,874.     Specification of Letters Patent.    Patented June 13, 1922.

Application filed February 11, 1920. Serial No. 357,802.

*To all whom it may concern:*

Be it known that I, CAMPBELL MACMILLAN, a citizen of the United States, residing at Schenectady, in the county of Schenectady, State of New York, have invented certain new and useful Improvements in Electric Ship Propulsion, of which the following is a specification.

My invention relates to electric propulsion systems and is especially adapted for electric ship propulsion.

An object of my invention is to provide a ship propulsion system which will be economical in first cost, efficient in operation and which will extend the advantages of electric ship propulsion to slow speed boats such as cargo boats and the like.

A further object of my invention is to provide a method of operation which will facilitate the application to electric ship propulsion of propeller driving motors arranged to operate normally as synchronous motors and to function as induction motors during maneuvering conditions.

A further object of my invention is to provide a motor having certain features of construction which adapt it to be connected to operate as an induction motor with the torque necessary for maneuvering conditions and which further adapt it to be excited to operate efficiently as a synchronous machine.

The requirements that must be met in electric ship propulsion equipments are in many cases very unfavorable to induction motor design and the difficulties increase as the propeller speed is reduced. It is desirable to use a high speed turbo-alternator, and even though a bipolar generator be used, the frequency is so high that with propeller speeds in the neighborhood of 100 revolutions per minute, a motor having from 60 to 80 poles must be used. The dimensions of the available space are, moreover, such as to restrict the diameter of the motor. An induction motor design to meet the conditions imposed has a very poor power factor. The low power factor requires excessive generator and motor capacity and reduces the efficiency of normal operation. I have, therefore, devised a system and method of operation which not only enables the production of adequate torque for maneuvering conditions, but in addition, permits of normal synchronous operation with the advantages of a high power factor.

My invention will be better understood from the following description taken in connection with the accompanying drawings, and its scope will be pointed out in the appended claims.

Figure 1:
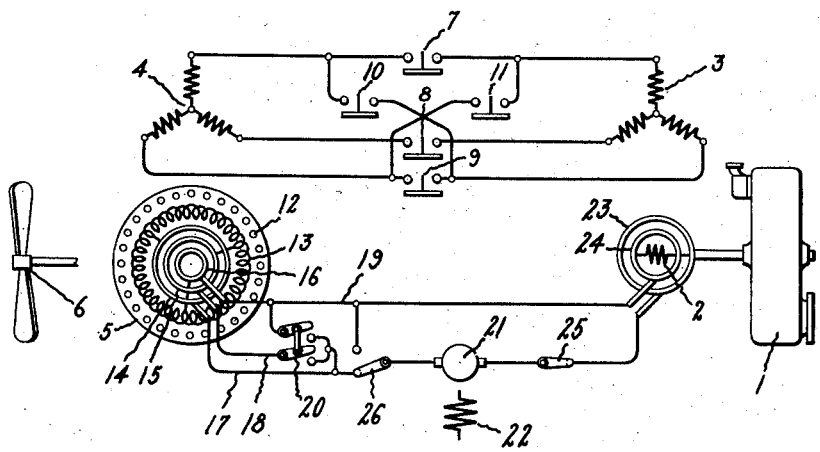
Figure 2:
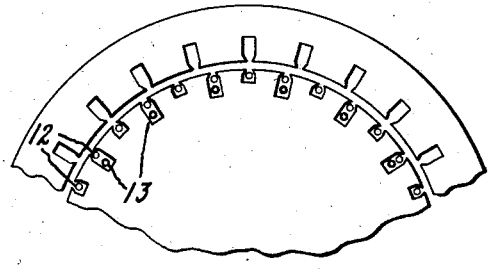

Referring to the accompanying drawings, Fig. 1 represents a ship propulsion system comprising a turbine driven generator and an alternating current propeller driving motor, and Fig. 2 represents the relative arrangement and numbers of slots for the windings of the motor stator and rotor and indicates the arrangement of conductors in the rotor slots.

Referring to Fig. 1, the turbine 1 is arranged to drive directly the revolving field member 2 of a synchronous generator whose stator 3 is arranged to supply current to the stator 4 of the propeller driving motor, the rotor 5 of which is arranged to drive directly the ship propeller 6. The turbine is preferably a high speed elastic fluid turbine of comparatively small overload capacity. The winding 3 of the generator is connected to the winding 4 of the motor through circuit controlling and reversing switches 7, 8, 9, 10 and 11. When the switches 7, 8 and 9 are closed the phase rotation will be such as to drive the propeller in one direction, and when the switches 8, 10 and 11 are closed the phase rotation will be reversed to reverse the direction of the propeller driving motor as is well known in the art to which this invention relates. The switches 7 to 11 may be controlled either manually or automatically and arranged for either direct or remote control as far as my invention is concerned.

The rotor or secondary element of the propeller driving motor is provided with two windings: one a high resistance squirrel cage winding 12 arranged next to the airgap, and a low resistance definite winding 13 arranged beneath the squirrel cage winding. I preferably provide the rotor member with a greater number of slots than the stator member and arrange the conductors of the high resistance secondary winding in each of the slots of the rotor, and arrange the conductors of the low resistance winding in but half the number of slots in the rotor member. For example, with a 480 slot stator, I may use a rotor member having 640 slots with the squirrel cage winding arranged in each of these slots and the definite winding arranged in 320 slots. The low resistance winding is provided with connections leading to slip rings 14, 15 and 16, in a manner well known in the art, and brushes bearing on these slip rings are connected to leads 17, 18 and 19. A switch 20 is provided which is arranged in its closed position to connect the three leads 17, 18 and 19 directly together, whereby the low resistance definite winding becomes short-circuited. An exciter 21 having a field winding 22 supplied in any desired manner is arranged to be connected to supply exciting current to the rotating field member 2 of the generator through slip rings 23 and 24 and to supply exciting current to the low resistance definite winding 13 of the motor through leads 17 and 19 connected to slip rings 14 and 16. A disconnecting switch 25 is connected in the circuit leading from one terminal of the exciter to the generator field winding 2, and a switching means 26 is provided, whereby the other terminal of the exciter may be connected either to the lead 17 or the lead 19.

I preferably provide an exciter 21 having three or four times the capacity of that required for exciting the generator alone. With the circuit connections indicated, it will be observed that the exciter may be connected either to excite the generator alone or to supply exciting current in series to the field winding 2 of the generator and the definite winding 13 of the motor. For example, if the switch 20 is in its closed position, the definite winding 13 will be short-circuited and the total exciter voltage will be applied to the generator field causing double excitation which is extremely desirable for producing the great induction motor torque required for maneuvering purposes. If the switch 20 be now opened, the exciter 21 will be connected to supply current to the motor and generator field windings in series. This circuit leads from one terminal of the exciter through the switch 25 to slip ring 23, through the winding 2 to slip ring 24, through lead 19 to slip ring 16, through definite winding 13 to slip ring 14 to lead 17 and switch 26 to the other terminal of the exciter. This connection causes normal exciting voltage to be supplied to the motor and reduces the exciting current of the generator to normal.

My arrangement of the motor secondary winding results in a much higher reactance for the definite winding than for the squirrel cage winding due to the small number of slots, the narrower and deeper shape of slot, and the belt leakage of the definite winding. The definite winding thus becomes a low resistance high reactance winding when short-circuited and in conjunction with the high resistance squirrel cage gives characteristics similar to a double squirrel cage motor. In addition, moreover, on account of the small number of slots and the high leakage factor, this definite winding can be used as the direct current field winding of a synchronous motor with reasonably good characteristics.

The operation of my invention will be most readily understood from a description of the steps performed and the effects produced when reversing the direction of motion of the ship. This maneuvering operation imposes the most difficult requirements upon a ship propulsion system for the reason that the torque required to break the propeller away from the water is approximately equal to full load torque. Assuming that the ship is proceeding in one direction at normal speed, the switch 20 will be in its open position and the exciter 21 connected to supply the motor and generator exciting windings in series. The motor will operate as a synchronous motor and the excitation will be chosen such that the power factor of the system will be maintained at the highest economical value. If now it is desired to reverse the ship, the exciting circuits will first be interrupted and the switches 7 to 11 then manipulated to reverse the phase rotation. The manipulation of the line switches is thus performed on a dead circuit with advantages well known in the art. The switch 20 will now be closed thus throwing the full exciter voltage and capacity on the generator field winding. The switch 20 also completes a polyphase short-circuit for the rotor winding 13. The generator excitation rises to two or three times normal value and the motor will operate as a double wound motor to reverse the propeller. At high values of slip, the torque will be produced mainly in the high resistance squirrel cage winding, but as the slip reduces the low resistance definite winding becomes increasingly effective. The turbine will first slow down due to the excessive torque of the reversed propeller, and as the torque decreases, the turbine will gradually speed up again. With the reduced speed of the generator, the motor will operate with practically full load torque to give a strong reversing action to the propeller. As soon as the motor approaches synchronous speed and steady conditions are reached, the short-circuiting switch 20 will be opened throwing direct current excitation into the motor winding 13, pulling the motor to exact synchronism with the generator and reducing the excitation of the generator to normal value.

While I have disclosed a particular arrangement of circuits, which is simple and effective to control the excitation circuits of the generator and motor in the desired manner, nevertheless, my invention is not limited to any particular arrangement of control circuits for carrying out the steps of the method I have devised.

In the above description of operation, I have assumed that the switch 20 is closed during the full period of operation as an induction motor, but while such an arrangement is effective and simplifies the switching means necessary for controlling the exciting current, nevertheless, my invention is not limited in this respect. If desired, the circuit of the low resistance definite winding 13 need not be completed until reversal of the ship has progressed, so far as to reduce the slip to a value where the winding 13 will begin to be effective to produce torque. The over-excitation may be applied to the generator by manipulating the switch 26 to connect the exciter directly to line 19. The switch 20, with this method of operation, will be closed when the slip has been somewhat reduced, and, after switch 20 has been closed, switch 26 may be thrown to connect with line 17 without interrupting the field circuit of the generator.

It is not believed to be necessary to describe the operation of the system during starting of the ship from stand-still, since this operation is obvious from the description of the operation of the system during reversal which operation has been set forth in detail. It is apparent that the starting will be carried out by operating the motor as an induction motor, the operation being changed to synchronous operation at the completion of this maneuvering operation.

While I have specifically described certain features of construction and methods of operation, it will be obvious to those skilled in the art that many modifications and variations are possible, and I aim, therefore, to cover all such modifications and variations as fall within the scope of my invention which is defined in the appended claims.

What I claim as new and desire to secure by Letters Patent of the United States, is:—

1. The method of reversing an electric ship propulsion plant comprising a synchronous generator, a turbine for driving the same, a source of excitation and an alternating current propeller driving motor having induction motor characteristics and adapted to be excited to operate as a synchronous machine which comprises removing the excitation from both generator and motor, reversing the connections between generator and motor, applying over excitation to the generator while maintaining the motor unexcited, whereby the motor is reversed as an induction motor, and when steady conditions have been reached, applying excitation to the motor to pull it into exact synchronism with the generator and reducing the excitation of the generator to normal.

2. An electric ship propulsion system comprising a synchronous generator, a motor provided with a high resistance low reactance squirrel cage winding and a low resistance high reactance definite winding, arranged to drive a propeller, an exciter, and means whereby said exciter may be connected to supply normal exciting current to both the definite winding of said motor and to the field winding of said generator for synchronous operation and whereby said definite winding may be short circuited and said generator overexcited for induction motor operation.

3. An electric ship propulsion system comprising a motor arranged to drive a propeller and provided with a winding arranged to give relatively high torque at large slip, and a definite winding adapted to be connected to give relatively high torque at small slip, a synchronous generator and means whereby it may be connected to supply current to drive said motor in either direction, an exciter of materially greater capacity than necessary to supply normal generator exciting current, and means whereby the exciter may be connected to supply current in series to the field winding of said generator and the definite winding of said motor for normal synchronous operation, and connections whereby said definite winding may be short circuited and the full voltage of said exciter supplied to said generator field winding for induction motor operation for maneuvering.

4. An electric ship propulsion system wherein an alternating current motor is arranged to drive a propeller and wherein a synchronous generator is arranged to supply current to operate the propeller driving motor, characterized by the fact that the motor secondary element is provided with a plurality of windings, one of which is of the high resistance squirrel cage type arranged adjacent the air gap in a number of slots greater than the number of slots in the stator, and the other of which is a definite winding arranged beneath the squirrel cage winding in one half the number of slots, and by the fact that means are provided for connecting said low resistance winding to act either as a secondary winding for induction motor operation or as an exciting winding for synchronous operation.

In witness whereof, I have hereunto set my hand this ninth day of February, 1920.

CAMPBELL MACMILLAN.